(12) United States Patent
Shtilkind

(10) Patent No.: US 12,474,989 B2
(45) Date of Patent: Nov. 18, 2025

(54) PROACTIVE PROBLEM DETECTION USING ALERT DATA AND INCIDENT DATA

(71) Applicant: ServiceNow, Inc., Santa Clara, CA (US)

(72) Inventor: Eugene Shtilkind, Poway, CA (US)

(73) Assignee: ServiceNow, Inc., Santa Clara, CA (US)

( * ) Notice: Subject to any disclaimer, the term of this patent is extended or adjusted under 35 U.S.C. 154(b) by 113 days.

(21) Appl. No.: 18/389,066

(22) Filed: Nov. 13, 2023

(65) Prior Publication Data

US 2025/0156259 A1    May 15, 2025

(51) Int. Cl.
  *G06F 11/07*    (2006.01)

(52) U.S. Cl.
  CPC ...... *G06F 11/0769* (2013.01); *G06F 11/0709* (2013.01)

(58) Field of Classification Search
  CPC ............ G06F 11/0769; G06F 11/0709; G06F 11/0766; G06F 11/3082; G06F 11/3065
  See application file for complete search history.

(56) References Cited

U.S. PATENT DOCUMENTS

| | | | |
|---|---|---|---|
| 11,226,858 B1 * | 1/2022 | Srivastava | ............ G06F 11/079 |
| 11,720,599 B1 * | 8/2023 | Lin | ...................... G06F 16/2246 |
| | | | 707/738 |
| 2017/0353543 A1 * | 12/2017 | Baltar | ................. H04L 41/0816 |
| 2020/0257585 A1 | 8/2020 | Balasubramanian | |
| 2021/0406112 A1 | 12/2021 | Moss | |
| 2022/0358102 A1 * | 11/2022 | Koru | ..................... G06F 16/258 |
| 2023/0289252 A1 * | 9/2023 | Settle | .................. G06F 11/3006 |

* cited by examiner

*Primary Examiner* — Bryce P Bonzo
*Assistant Examiner* — Xinyuan Yu
(74) *Attorney, Agent, or Firm* — MCDONNELL BOEHNEN HULBERT & BERGHOFF LLP

(57) ABSTRACT

In various embodiments, a process for proactive problem detection using alert data and incident data includes receiving machine-generated alerts of an information technology environment and receiving user-specified incidents of the information technology environment. The process includes combining the machine-generated alerts and the user-specified incidents into a combined group, clustering elements of the combined group into one or more component clusters, and determining a relative priority between the one or more component clusters based on one or more properties of corresponding elements belonging to the one or more component clusters.

18 Claims, 6 Drawing Sheets

PROACTIVE PROBLEM DETECTION USING ALERT DATA AND INCIDENT DATA

BACKGROUND OF THE INVENTION

Information technology environments may have problems when the system or constituent components such as hardware or software devices do not function as intended. Currently, there are manual and computer-implemented methods that attempt to detect and/or anticipate the problems. However, conventional techniques for problem detection are typically slow and not helpful because the problem is detected too late. Thus, there is a need for improved problem detection.

BRIEF DESCRIPTION OF THE DRAWINGS

Various embodiments of the invention are disclosed in the following detailed description and the accompanying drawings.

DETAILED DESCRIPTION

Figure 1:
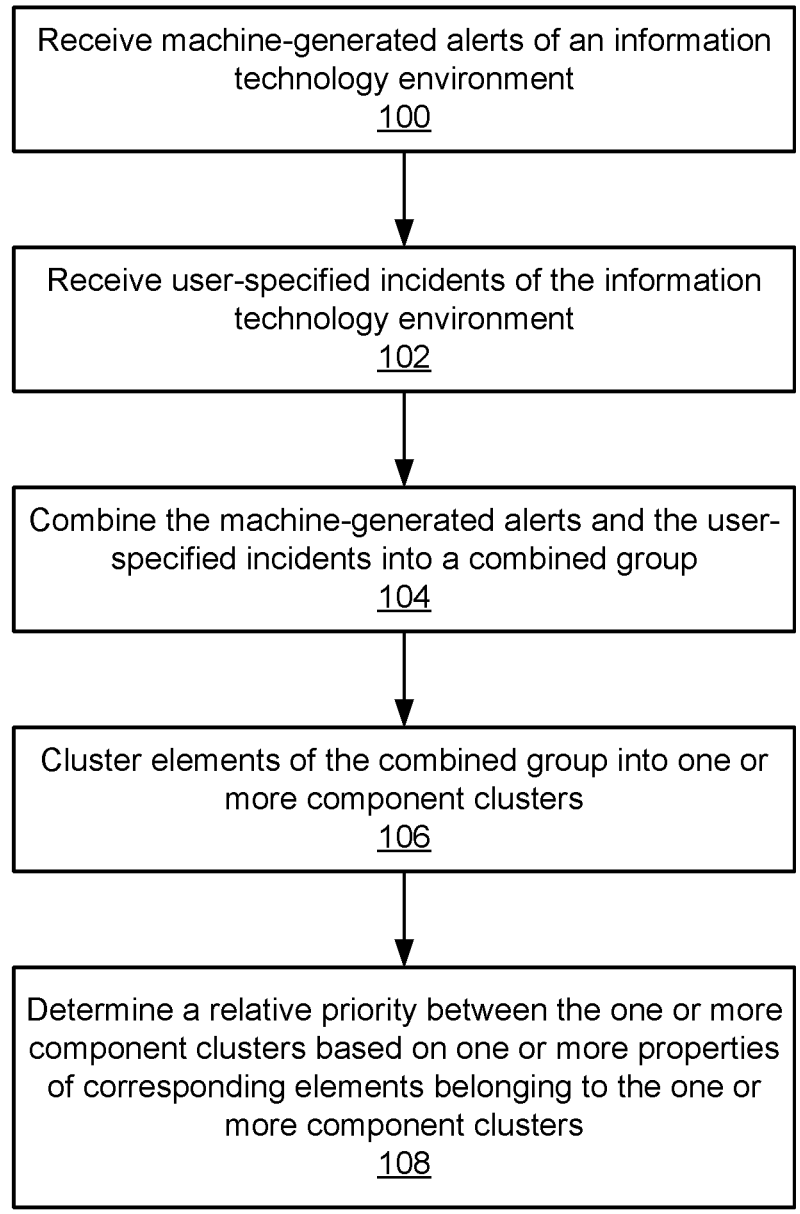
FIG. 1 is a flow diagram illustrating an embodiment of a process for proactive problem detection using alert data and incident data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, "alert data" (sometime called "machine-generated alerts" or simply "alerts") refers to machine-generated data, which tends to be voluminous but noisy. "Incident data" (sometimes called "user-specified incidents" or simply "incidents") refers to human-generated data which tends to be high-signal (likely real/helpful) but low volume. "Problems" refer to underlying causes of alerts and incidents such as unexpected computer or system behavior. Conventional techniques for computer-implemented problem detection typically use only alert data or only incident data. Using alert data by itself is challenging because it is difficult to accurately identify problems from the large volume of noisy data. Using incident data alone is also ineffective because typically by the time the computer identifies a problem, the problem has already been manually identified.

Techniques for proactive problem detection using alert data and incident data are disclosed. Alert data (which tends to be high-volume but noisy) and incident data (which tends to be low-volume but high-signal/helpful) are combined to improve problem detection. Alerts and incidents are mapped to the same vector space (e.g., each alert/incident is converted to a vector) and clustered to group similar alerts and incidents. The groups are then ranked/prioritized, and problems are determined based on the ranked groups of alerts/incidents. The clustering and/or ranking may also use metadata such as weighting incidents by priority or impacted services. Optionally, a (large) language model is used to process alerts and/or incidents to obtain a more salient or shorter description of alerts/incidents prior to clustering.

For example, a process for proactive problem detection includes receiving machine-generated alerts and user-specified incidents of the information technology environment. The machine-generated alerts and the user-specified incidents are combined into a combined group. The process clusters elements of the combined group into one or more component clusters. The process then determines a relative priority between the one or more component clusters based on one or more properties of corresponding elements belonging to the one or more component clusters.

FIG. 1 is a flow diagram illustrating an embodiment of a process for proactive problem detection using alert data and incident data. This process may be implemented on or by the problem detector 560 of FIG. 5 or the processor 602 of FIG. 6.

In the example shown, the process begins by receiving machine-generated alerts of an information technology environment (100). The information technology environment may include any environment that includes one or more hardware or software devices. An example of an information technology environment is further described herein with respect to FIG. 5.

In various embodiments, the machine-generated alerts include alerts that are automatically generated or triggered. The alerts may be associated with performance of the information technology environment or constituent components. For example, an alert is generated every time the server exceeds 60% CPU utilization or if there is an error on the server. Many alerts may be generated, so the machine-generated alert data is voluminous. Alerts do not necessarily indicate a problem. For example, they may be automatically generated frequently and naturally resolved over time. Returning to the example of CPU utilization, alerts may be generated every time utilization exceeds a particular threshold, and the utilization may naturally decrease when fewer applications are running The process receives user-specified incidents of the information technology environment (102). The user-specified incidents may be a manually-determined report or data generated in response to a rule. For example, a manually-determined report such as a service ticket is reported by a user. As another example, a particular user or enterprise may have rules that cause user-specified incidents to be generated. For example, a rule may specify that if the number of times a user unsuccessfully attempts to access an account exceeds a threshold, then a user-specified incident is generated. That is, a specific incident is determined in response to a rule, where the specific incident is associated with performance of the information technology environment.

The machine-generated alerts received at 100 and/or the user-specified incidents received at 102 may indicate that there is an underlying problem. The problem refers to behavior or performance of the information technology environment that is anything other than intended, desired, or expected. Typically, root cause analysis is performed to determine what is causing an alert such as CPU utilization exceeding 60%. Currently, root cause analysis is not performed as frequently or as rigorously as desired because it is time-consuming and difficult to review the data and determine causes of problems. The disclosed techniques may be applied to identify problems and facilitate root cause analysis, among other things.

Various types of problems have been observed. A first type of problem, called a "major incident derived problem," refers to an incident that impacts many users. An example of a major incident derived problem is an enterprise that uses a particular customer relationship management (CRM) tool and experiences a problem with that tool that impacts numerous areas such as the technical aspects of project management and campaigns. This problem may impact on the order of hundreds or thousands of users, organizations, or people. This particular problem causes the impacted users to create user-specific incidents. Consequently, major incident derived problems are typically quickly and easily identified.

Another type of problem, called a "latent problem," refers to an incident that is easily overlooked. For example, a latent problem may impact a relatively small number of users or is otherwise more difficult to identify. An effective proactive problem detector would be able to be sufficiently fast and accurate so that a user does not ignore problems (which happens when problems are too numerous) and the problem is detected and presented before the user identifies the problem.

In various embodiments, the received machine-generated alerts and/or the user-specified incidents may be processed to improve the quality of the data, which improves the effectiveness of subsequent processing. For example, a machine learning model may be used to determine a description of the data as further described with respect to FIG. 2. As another example, classifiers may be used to improve the accuracy of data. A classifier may remove repeat text if it is not useful for identification.

The process combines the machine-generated alerts and the user-specified incidents into a combined group (104). Creating a combined group causes the machine-generated alerts and the user-specified incidents to be processed together. One benefit of combining the machine-generated alerts and the user-specified incidents is that problems can be identified more accurately and faster. By also considering the user-specified incidents, the accuracy and confidence of problem detection using machine-generated alerts is improved. For example, the alerts and incidents are placed in a common vector space. A particular clustering model, similarity model, or the like may be used for both the alerts and incidents as follows.

The process clusters elements of the combined group into one or more component clusters (106). Processing the combined group, which includes both alerts and incidents, allows the alerts and incidents to be compared. Clustering identifies similarities and differences between the elements of the group. By way of non-limiting example, clustering is performed using k-means clustering. For example, if a first alert and a first incident are close together in the common vector space, that indicates that the first alert and the first incident are similar to each other. Conversely, if a first alert and a first incident are far apart, then this indicates that they are different from or not related to each other. Elements that are close to each other may indicate that they belong to the same problem, while elements that are far apart from each other may indicate that they do not belong to the same problem. In various embodiments, combining and clustering the machine-generated alerts and the user-specified incidents (104 and 106) is performed using a machine learning model such as a clustering model or a similarity model.

Conventionally, different types of data (e.g., alerts and incidents) are not analyzed together because they are usually processed or reviewed by different users or machines. This may cause problems to be overlooked. By contrast, the disclosed techniques analyze alert and incident data together. There may be a set of noisy alert data that does not appear to point to an underlying problem. However, an incident is received that is similar to the alerts, which causes a problem to be identified that otherwise would not have been identified if the two types of data (alerts and incidents) were not reviewed together. An example of a process to cluster elements is further described with respect to FIG. 3.

The process determines a relative priority between the one or more component clusters based on one or more properties of corresponding elements belonging to the one or more component clusters (108). In various embodiments, each cluster of the one or more component clusters corresponds to a particular problem associated with the information technology environment. The relative priority between the one or more component clusters indicates a severity of a corresponding problem. In various embodiments, the priority of a component cluster is determined based on the number of (weighted) elements assigned to the component cluster. The elements may be optionally weighted based on their properties.

Various properties of an element may affect the priority of the component cluster to which it belongs. An example property is the service that a certain incident or alert is impacting. The impacted service may be reported by a configuration management database (CMDB), as further described with respect to FIG. 5. A service may have different pre-determined levels of criticality. For example, some services are considered critical while others are not. An alert or incident associated with a critical service may be assigned a higher weight than an alert or incident that is not associated with a critical service.

As another example, because incident data may be more indicative of a problem than noisy alert data, clusters with more incidents may be weighted more heavily than clusters with fewer incidents. This increases the priority of clusters that have relatively more incidents. In other words, determining the relative priority between the one or more component clusters includes assigning a greater weight to a first component cluster that includes more machine-generated alerts compared with a second component cluster that includes fewer machine-generated alerts. As yet another example, incident data may have metadata indicating the priority of the incident. This may be used to weight incidents themselves by priority, consequently also affecting the priority of the component cluster to which it belongs.

In other words, a ranking algorithm may be performed on the one or more component clusters that takes into account properties of the elements of the component clusters such as priority and service importance/criticality. For example, an element may have an assigned identification of importance/criticality level or score. The determined relative priority may be used in a variety of ways such as for performing root cause analysis. The relative priority allows problems to be addressed in an optimal order, which may be more effective than randomly investigating problems or handling problems in another order.

Identifying a problem according to the process of FIG. 1 is helpful because by proactively identifying a problem, further user-specific incidents associated with this problem may be avoided by noting that this is a known problem or resolving the problem. For example, without the disclosed techniques, 300 incidents may be received. By using the disclosed techniques to proactively identify a problem, the problem is identified after two incidents are received and resolved by the time 50 incidents are received, saving 250 incidents worth of productivity.

Figure 2:
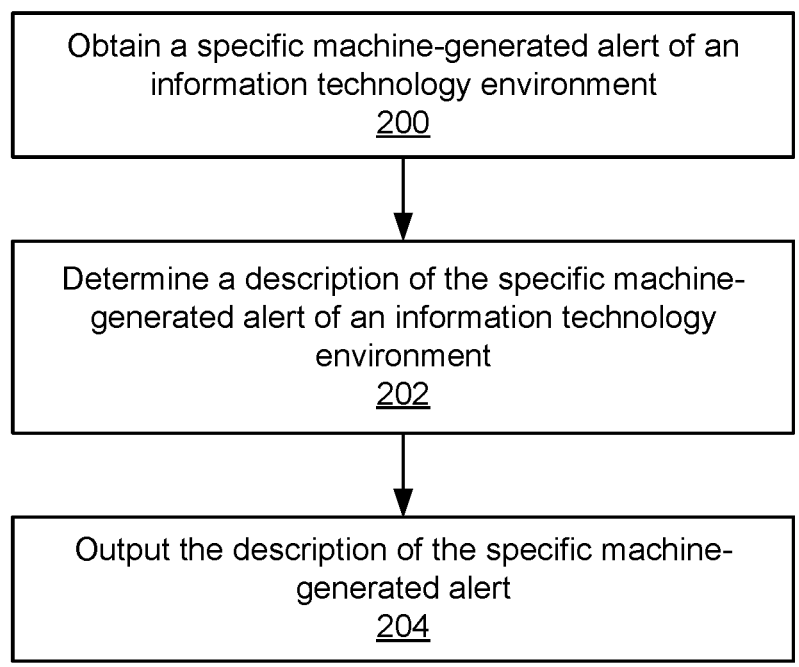
FIG. 2 is a flow diagram illustrating an embodiment of a process for determining a description of a machine-generated alert.

FIG. 2 is a flow diagram illustrating an embodiment of a process for determining a description of a machine-generated alert. This process may be implemented on or by the problem detector 560 of FIG. 5 or the processor 602 of FIG. 6. The process may be performed as part of another process. For example, the process may be performed prior to 104 of FIG. 1 to determine a description of each machine-generated alert of at least a subset of the machine-generated alerts received at 100. The determined description is then combined with user-specified incidents at 104.

Returning to FIG. 2, in the example shown, the process begins by obtaining a specific machine-generated alert of an information technology environment (200). The specific machine-generated alert may be an alert received at 100 of FIG. 1. The process of FIG. 2 may be performed for one or more of the alerts received at 100 to determine a description of the respective alert.

The process determines a description of the specific machine-generated alert (202). In various embodiments, machine-generated alerts include metric-based alerts associated with performance of the information technology environment. Machine-generated alerts such as log data can be quite voluminous, which requires more computing resources and time to process. A description may be generated for the alert, so that subsequent processing is expedited. For example, the description may be a summary, shortened version, a most salient portion of the alert, intent of the alert, or the like. In various embodiments, the description is determined by using a machine learning model such as a (large) language model. For example, a language model is queried to identify an underlying issue of the alert, and the language model responds with a short (e.g., two-sentence) summary of the alert. Thus, the description of the specific machine-generated alert is shorter than the specific machine-generated alert used to determine the description of the specific machine-generated alert. The description may improve combining (104) or clustering (106) of FIG. 1 because a smaller and more relevant/useful set of data is determined and used for subsequent processing.

The process outputs the description of the specific machine-generated alert (204). The description may be used instead of the corresponding machine-generated alert for clustering. Referring briefly to 104 of FIG. 1, the combined group includes a combination of the determined description of the specific machine-generated alert and the user-specified incidents.

Although not shown, a description may be generated for a user-specified incident in the same manner. However, user-specified incidents tend to be relatively shorter and more descriptive, so machine-generated alerts may benefit more from being post-processed to obtain a description by comparison.

Figure 3:
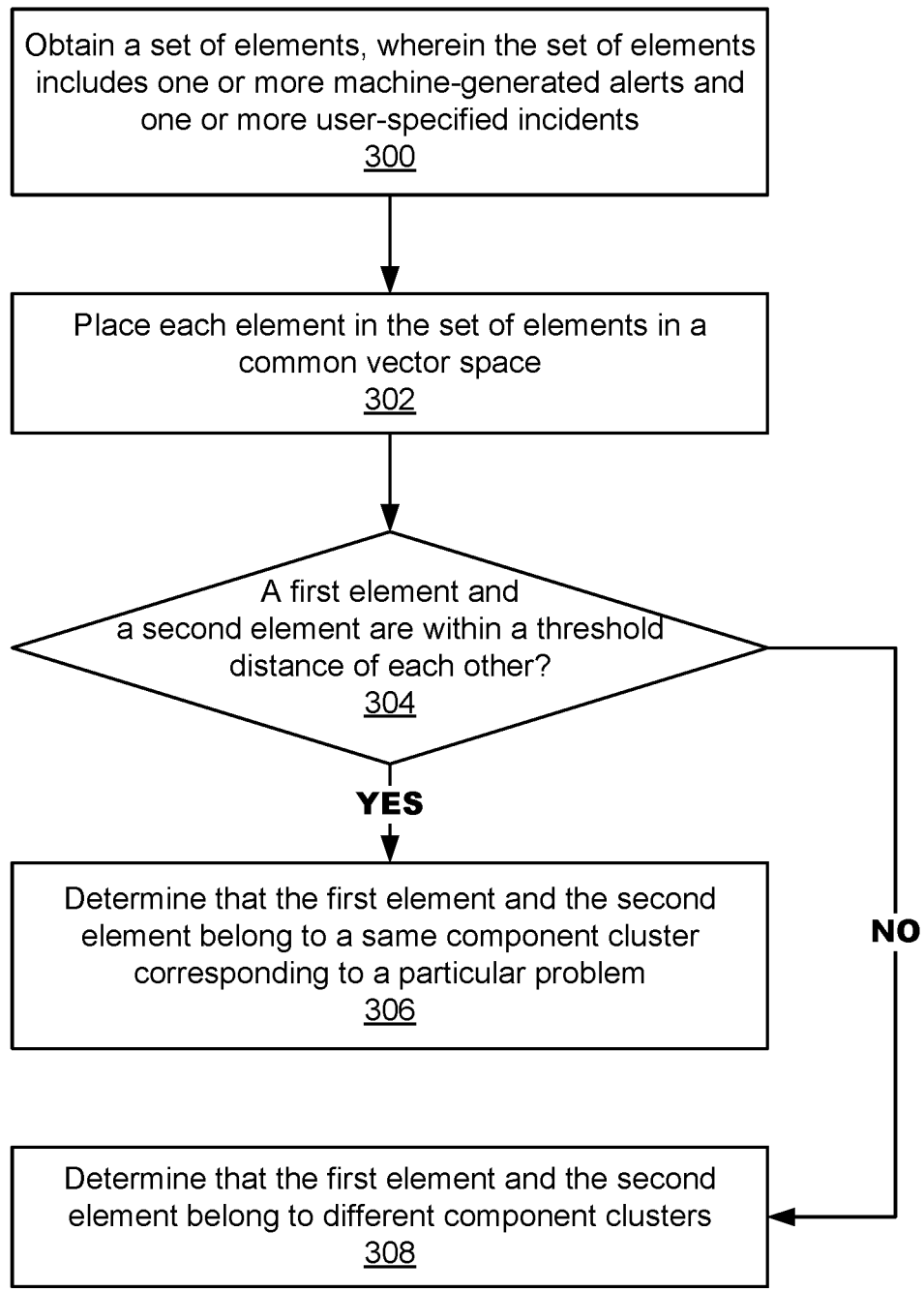
FIG. 3 is a flow diagram illustrating an embodiment of a process for clustering elements of a combined group into one or more component clusters.

FIG. 3 is a flow diagram illustrating an embodiment of a process for clustering elements of a combined group into one or more component clusters. This process may be implemented on or by the problem detector 560 of FIG. 5 or the processor 602 of FIG. 6. The process may be performed as part of another process. For example, the process may be performed at 106 of FIG. 1.

Returning to FIG. 3, in the example shown, the process begins by obtaining a set of elements, wherein the set of elements includes one or more machine-generated alerts and one or more user-specified incidents (300). The machine-generated alerts and user-specified incidents may include those alerts and incidents received at 100 and 102 of FIG. 1

The process places each element in the set of elements in a common vector space (302). As described herein, mapping the elements to the common vector space allows the elements to be compared with each other regardless of type (e.g., alert vs. incident). The process determines whether a first element of the set of elements and a second element of the set of elements are within a threshold distance of each other (304). If the first element and the second element are within a threshold distance of each other, the process determines that the first element and the second element belong to a same component cluster corresponding to a particular problem (306). Otherwise, if the first element and the second element are not within a threshold distance of each other, the process determines that the first element and the second element belong to different component clusters (308).

Figure 4:
FIG. 4 shows an example of elements clustered into one or more component clusters.

FIG. 4 shows an example of elements clustered into one or more component clusters. The process of FIG. 3 will be explained with the aid of FIG. 4. In this example, elements with the same shading belong to the same group. The shape of the element indicates the type of element. In this example, circles represent alerts and diamonds represent incidents.

Element 402 (an incident) and element 404 (an alert) are within a threshold distance of each other, while element 404 and element 406 (an incident) are not within the threshold distance of each other. Thus, 402 and 404 are considered to be in the same group (Group 1), while incident 406 is not part of Group 1. Each of the elements may be clustered in this way to form three groups here. The groups may be prioritized based on properties of the elements. For example, Group 1 corresponds to Problem 1, which has a higher priority than Group 2 (Problem 2), and Group 3 (Problem 3). In this example, incidents are given a greater weight than alerts. In this example, the reason why Group 1 has a higher priority than Group 2, and Group 2 has a higher priority than Group 3 is that there are more incidents in Group 1 than Group 2 (and similarly more incidents in Group 2 than Group 3).

Figure 5:
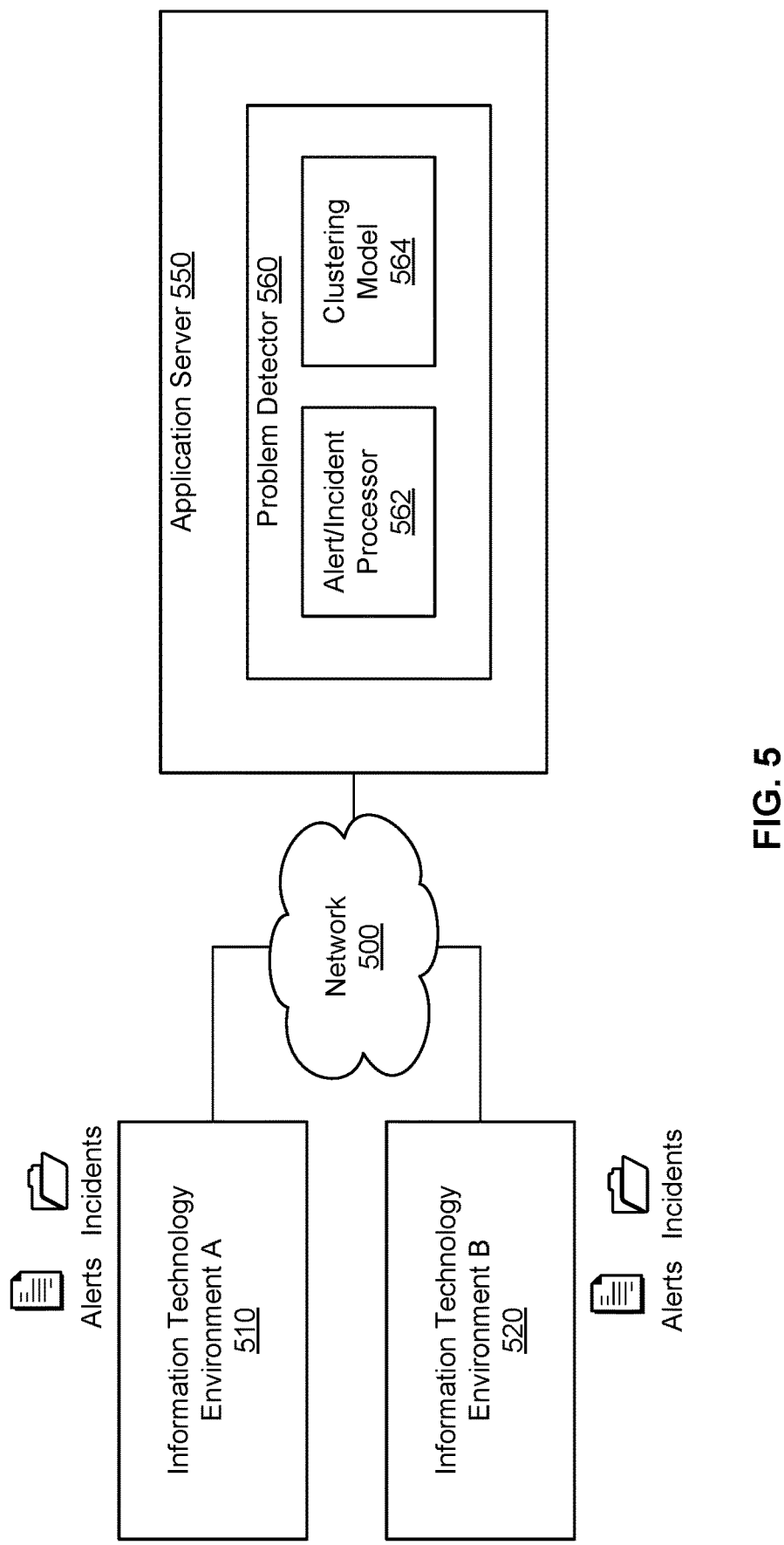
FIG. 5 is a block diagram illustrating an embodiment of a system for proactive problem detection using alert data and incident data.

FIG. 5 is a block diagram illustrating an embodiment of a system for proactive problem detection using alert data and incident data. In the example shown, application server 550, information technology environment 510, and information technology environment 520 are connected via network 500. The information technology environment 510 and the information technology environment 520 may be associated with respective customers or user and are thus labeled "A" and "B." Network 500 can be a public or private network. In some embodiments, network 500 is a public network such as the Internet. In various embodiments, application server 550 is a cloud-based application server that provides application services including an information technology operations management (ITOM) cloud service to determine metrics of a digital service (sometimes simply referred to as "services") running within a customer network such as a customer network environment. For example, alert data, incident data, or other performance metrics that may be used for proactive problem detection are collected. Application server 550 together with a server internal to each of environments 510 and 520 are part of a platform for collecting alert and incident data for proactive problem detection In some embodiments, application server 550 provides cloud-based services for managing information technology operations including creating computer programs in cooperation with the customer's information technology environment. In some embodiments, application server 550 offers additional cloud services such as a configuration management database (CMDB) service for managing devices and/or configuration items for a customer. In some embodiments, application server 550 provides functionality to analyze configuration data.

In some embodiments, each of environments 510 and 520 is an information technology network environment and includes multiple hardware or software devices. Each of the devices or other components of the environments 510 and 520 may generate metrics or other performance data that cause alerts or incidents to be created.

In this example, the application server 550 includes a problem detector 560. The problem detector 560 is configured to perform the techniques disclosed herein, e.g., the process of FIG. 1 to proactively detect problems based on alerts and incidents associated with environments 510 and 520. In various embodiments, the problem detector includes an alert/incident processor 562 and a clustering model 564. The alert/incident processor 562 is configured to process the received alerts and/or incidents to improve accuracy. For example, the alert/incident processor 562 performs the process of FIG. 2 to determine a description of a machine-generated alert. The clustering model 564 is configured to identify alerts and/or incidents that are similar to each other by grouping those alerts and/or incidents that are similar to each other. For example, the clustering model 564 performs the process of FIG. 3 to determine component clusters. Although the examples herein refer to clustering or a clustering model, alternative techniques such as using a similarity model to identify similarities between elements may be used.

Although single instances of some components have been shown to simplify the diagram of FIG. 5, additional instances of any of the components shown in FIG. 5 may exist. For example, application server 550 may include one or more servers and/or may share servers. In some embodiments, components not shown in FIG. 5 may also exist. For example, network clients used to access application server 550 are not shown.

Figure 6:
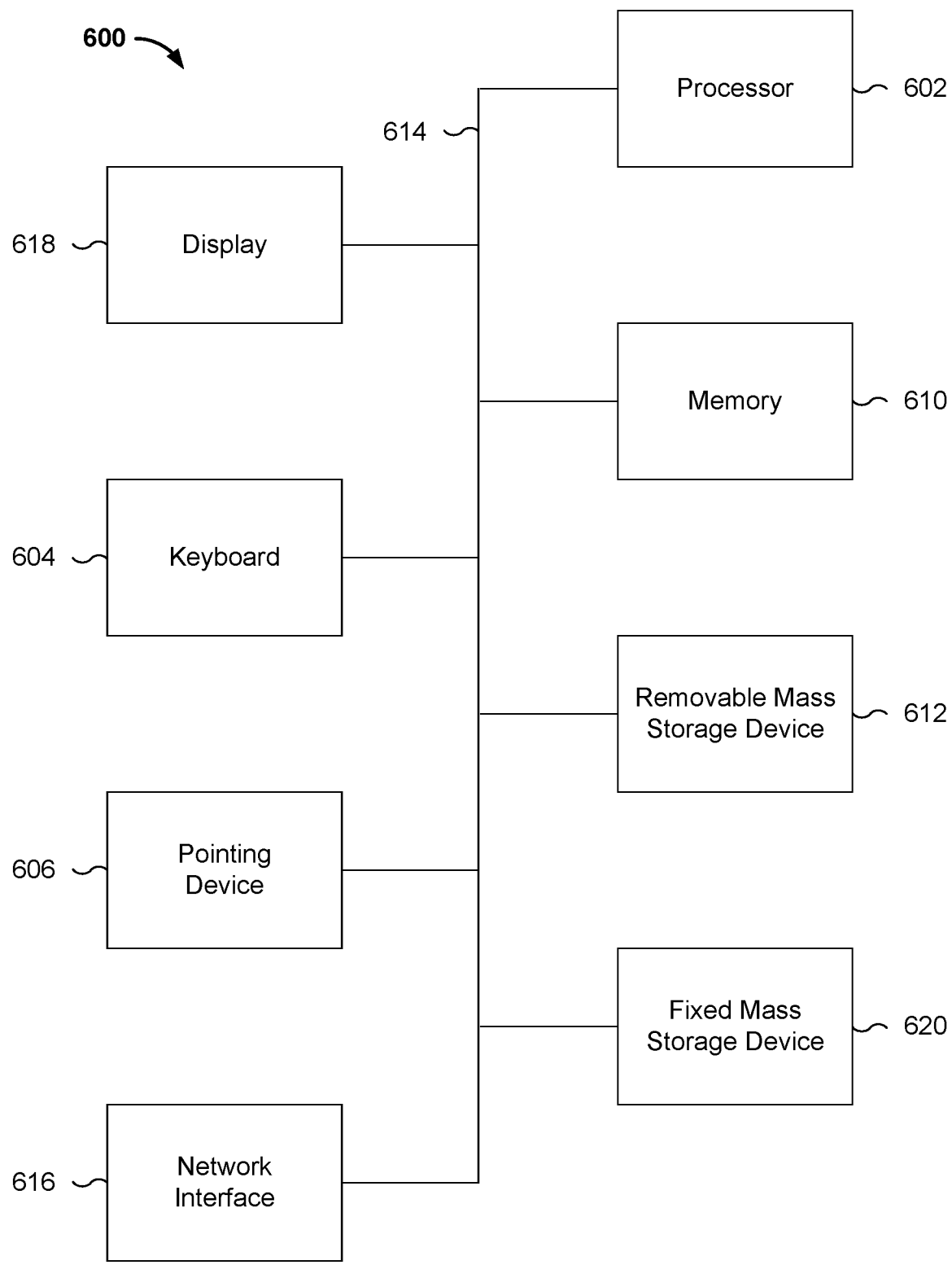
FIG. 6 is a functional diagram illustrating a programmed computer system for providing a configuration data analyzer in accordance with some embodiments.

FIG. 6 is a functional diagram illustrating a programmed computer system for providing a configuration data analyzer in accordance with some embodiments. As will be apparent, other computer system architectures and configurations can be used to provide a configuration data analyzer. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618). In some embodiments, processor 602 includes and/or is used to provide a configuration data analyzer and/or executes/performs the processes described with respect to FIGS. 1-3.

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storage 612, 620 generally store additional programming instructions, data, and the like that typically are not in active use by the processor 602. It will be appreciated that the information retained within mass storage 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving machine-generated alerts of an information technology environment including an alert that a CPU utilization of a server in the information technology environment has exceeded a utilization threshold;
receiving user-specified incidents of the information technology environment including a user-specified incident related to the CPU utilization of the server;
combining the machine-generated alerts and the user-specified incidents into a combined group;
clustering elements of the combined group into one or more component clusters, wherein a first component cluster of the one or more component clusters is associated with the alert that the CPU utilization of the server has exceeded a utilization threshold and the user-specified incident related to the CPU utilization of the server;
determining a relative priority between the one or more component clusters based on one or more properties of corresponding elements belonging to the one or more component clusters, the one or more properties of the corresponding elements include whether the element is a machine-generated alert or a user-specified incident, wherein determining the relative priority between the one or more component clusters includes assigning a greater weight to a component cluster of the one or more component clusters that includes more machine-generated alerts compared with another component cluster of the one or more components clusters that includes fewer machine-generated alerts; and
reducing the CPU utilization of the server based on the determined relative priority by reducing a number of applications running on the server.

2. The method of claim 1, wherein the machine-generated alerts include automatically-generated alerts associated with performance of the information technology environment.

3. The method of claim 1, wherein the user-specified incidents include manually-determined reports associated with performance of the information technology environment.

4. The method of claim 1, wherein the user-specified incidents include a specific incident determined in response to a rule, the specific incident being associated with performance of the information technology environment.

5. The method of claim 1, further comprising:
obtaining a specific machine-generated alert of the machine-generated alerts;
determining a description of the specific machine-generated alert; and
outputting the description of the specific machine-generated alert, wherein the combined group includes a combination of the determined description of the specific machine-generated alert and the user-specified incidents.

6. The method of claim 5, wherein at least one of:
the description of the specific machine-generated alert is shorter than the specific machine-generated alert used to determine the description of the specific machine-generated alert; or
the description of the specific machine-generated alert includes an intent of the specific machine-generated alert.

7. The method of claim 5, wherein the description of the specific machine-generated alert is determined using a machine learning model.

8. The method of claim 1, wherein the combination of the machine-generated alerts and the user-specified incidents into the combined group and the clustering of the elements of the combined group into the one or more component clusters is performed using a machine learning model.

9. The method of claim 1, wherein clustering the elements of the combined group into the one or more component clusters includes:

obtaining a set of elements, wherein the set of elements includes one or more machine-generated alerts and one or more user-specified incidents;
placing each element in the set of elements in a common vector space; and
in response to a determination that a first element of the set of elements and a second element of the set of elements are within a threshold distance of each other, determining that the first element and the second element belong to a same component cluster corresponding to a particular problem.

10. The method of claim 9, wherein:
the first element is a machine-generated alert and the second element is a user-specified incident;
the particular problem includes an unexpected behavior in the information technology environment; and
determining that the first element and the second element belong to the same component cluster corresponding to the particular problem includes determining that the unexpected behavior in the information technology environment caused the first element to be generated and the second element to be specified.

11. The method of claim 1, wherein clustering the elements of the combined group into the one or more component clusters includes:
obtaining a set of elements, wherein the set of elements includes one or more machine-generated alerts and one or more user-specified incidents;
placing each element in the set of elements in a common vector space; and
in response to a determination that a first element of the set of elements and a second element of the set of elements are not within a threshold distance of each other, determining that the first element and the second element belong to different component clusters.

12. The method of claim 1, wherein:
each cluster of the one or more component clusters corresponds to a particular problem associated with the information technology environment; and
the relative priority between the one or more component clusters indicates a severity of a corresponding problem.

13. The method of claim 1, wherein determining the relative priority between the one or more component clusters includes:
assigning a weight to each element of a set of elements belonging to a first component cluster of the one or more component clusters; and
determining a priority of the first component cluster based at least on the weighted elements.

14. The method of claim 1, wherein determining the relative priority between the one or more component clusters includes ranking the one or more component clusters based at least on the one or more properties of the corresponding elements belonging to the one or more component clusters.

15. The method of claim 14, wherein the one or more properties includes an identification of importance of a corresponding element.

16. The method of claim 14, wherein the one or more properties includes a corresponding element being associated with a critical service.

17. A system, comprising:
a processor configured to:
receive machine-generated alerts of an information technology environment including an alert that a CPU utilization of a server in the information technology environment has exceeded a utilization threshold;
receive user-specified incidents of the information technology environment including a user-specified incident related to the CPU utilization of the server;
combine the machine-generated alerts and the user-specified incidents into a combined group;
cluster elements of the combined group into one or more component clusters, wherein a first component cluster of the one or more component clusters is associated with the alert that the CPU utilization of the server has exceeded a utilization threshold and the user-specified incident related to the CPU utilization of the server;
assign a weight to each of the one or more component clusters based on a relative number of machine-generated alerts and user-specified incidents associated with the corresponding component cluster;
determine a relative priority between the one or more component clusters based on the weights assigned to the one or more component clusters;
reduce the CPU utilization of the server based on the determined relative priority by reducing a number of applications running on the server; and
a memory coupled to the processor and configured to provide the processor with instructions.

18. A computer program product comprising a non-transitory computer readable medium and computer instructions for:
receiving machine-generated alerts of an information technology environment including an alert that a CPU utilization of a server in the information technology environment has exceeded a utilization threshold;
receiving user-specified incidents of the information technology environment including a user-specified incident related to the CPU utilization of the server;
combining the machine-generated alerts and the user-specified incidents into a combined group;
clustering elements of the combined group into one or more component clusters, wherein a first component cluster of the one or more component clusters is associated with the alert that the CPU utilization of the server has exceeded a utilization threshold and the user-specified incident related to the CPU utilization of the server;
assigning a weight to each of the one or more component clusters based on a relative number of machine-generated alerts and user-specified incidents associated with the corresponding component cluster;
determining a relative priority between the one or more component clusters based on the weights assigned to the one or more component clusters; and
reducing the CPU utilization of the server based on the determined relative priority by reducing a number of applications running on the server.

* * * * *